United States Patent
Pai

(10) Patent No.: US 10,489,370 B1
(45) Date of Patent: Nov. 26, 2019

(54) OPTIMIZING DATA LOSS PREVENTION PERFORMANCE DURING FILE TRANSFER OPERATIONS BY FRONT LOADING CONTENT EXTRACTION

(71) Applicant: Symantec Corporation, Mountain View, CA (US)

(72) Inventor: Manish Pai, Pune (IN)

(73) Assignee: Symantec Corporation, Mountain View, CA (US)

( * ) Notice: Subject to any disclaimer, the term of this patent is extended or adjusted under 35 U.S.C. 154(b) by 464 days.

(21) Appl. No.: 15/076,521

(22) Filed: Mar. 21, 2016

(51) Int. Cl.
*G06F 16/22* (2019.01)
*G06F 16/215* (2019.01)

(52) U.S. Cl.
CPC ........ *G06F 16/2272* (2019.01); *G06F 16/215* (2019.01)

(58) Field of Classification Search
None
See application file for complete search history.

(56) References Cited

U.S. PATENT DOCUMENTS

| | | | | |
|---|---|---|---|---|
| 6,112,250 | A * | 8/2000 | Appelman | H04L 67/36 709/203 |
| 9,235,590 | B1 * | 1/2016 | Wang | H03M 7/42 |
| 2007/0016785 | A1 * | 1/2007 | Guay | H04L 9/3236 713/176 |
| 2007/0226320 | A1 * | 9/2007 | Hager | G06F 17/30097 709/219 |
| 2009/0094252 | A1 * | 4/2009 | Wong | H04L 67/06 |
| 2010/0281224 | A1 * | 11/2010 | Ho | G06F 17/30902 711/137 |
| 2012/0084263 | A1 * | 4/2012 | Gosnell | G06F 17/30067 707/667 |
| 2012/0127606 | A1 * | 5/2012 | Starr | G11B 27/002 360/79 |
| 2013/0103655 | A1 * | 4/2013 | Fanghaenel | G06F 17/30336 707/693 |

(Continued)

OTHER PUBLICATIONS

Technical Description: "Cache Recently Extracted Text to Avoid Duplicate Extraction," feature of the "Oak Effort of the Apache Jackrabbit project." Created Jul. 11, 2015, 3 pages.

*Primary Examiner* — Alex Gofman
*Assistant Examiner* — Umar Mian
(74) *Attorney, Agent, or Firm* — Patent Law Works LLP

(57) ABSTRACT

Latency of DLP policy application during file transfer operations is decreased, by front loading the extraction of file content. The potential extraction latencies of files are quantified based on attributes such as size and/or type. Files with potential extraction latencies that meet a given threshold are identified for pre-transfer content extraction, and their content is extracted and stored. An index of the stored extracted content is maintained, tracking all files from which content has been extracted, according to factors such as size and checksum. When a specific file in the filesystem is transferred, it is determined whether its content has already been extracted, for example by matching the file size and checksum against those for which extracted content has been stored. Responsive to determining that content of the specific file has already been extracted and stored, the stored content is utilized when applying DLP, thereby greatly increasing performance.

18 Claims, 3 Drawing Sheets

(56) References Cited

U.S. PATENT DOCUMENTS

2015/0026757 A1* 1/2015 Reddy .................... H04L 63/20
 726/1
2016/0042006 A1* 2/2016 Singh ................ G06F 17/30153
 707/693
2016/0301693 A1* 10/2016 Nikulin ............... H04L 63/0876

* cited by examiner

OPTIMIZING DATA LOSS PREVENTION PERFORMANCE DURING FILE TRANSFER OPERATIONS BY FRONT LOADING CONTENT EXTRACTION

TECHNICAL FIELD

This disclosure pertains generally to data loss prevention technology, and more specifically to optimizing time spent applying data loss prevention functionality during file transfer operations, by front loading content extraction.

BACKGROUND

Especially with the widespread use of cloud based storage and mobile computing and storage devices, enterprises and other organizations are subject to loss and leakage of their sensitive information, as a result of both inadvertent and malicious user activity. Data Loss Prevention ("DLP") systems can monitor, detect and block operations on sensitive information when it is accessed, copied, transmitted and stored. By doing so, DLP systems can protect sensitive information according to defined organizational policies. As one example, within a given company certain members of the Human Resources department may be authorized to access personal employee information such as home addresses and social security numbers. However, copying such personal employee information to non-company cloud storage or USB devices could be a violation of company policy. DLP systems can classify specific information as sensitive, identify and monitor such information, and detect, block, generate alerts or take other desired actions in response to specific attempted operations and incidents.

When a DLP agent is in use, there can be significant delay in the out-bound file transfer operation, such as copying files, sending emails with attachments, or uploading files to web servers. DLP based monitoring and analysis of these operations can cause delay that is significant enough to irritate users and interfere with productivity. DLP can routinely triple the time required for a file transfer, and depending upon the size and type of the content involved, increases in latency of five or even ten times are possible.

It would be desirable to address this issues.

SUMMARY

Latency of DLP policy application during file transfer operations is decreased, by front loading the extraction of file content. The potential extraction latencies of files in the filesystem of a computer are quantified. This can be done, for example, by crawling the filesystem and quantifying the potential extraction latency of each specific file. The potential extraction latency of a file can be thought of as a measure of the length of time extraction of the file's content is anticipated to take. A file's potential extraction latency can be quantified based on attributes such as its size and/or type. In one embodiment, weights are assigned to different file types, and potential extraction latencies of files are calculated as a function of their weights and sizes. Those files with potential extraction latencies that meet a given threshold are identified for pre-transfer content extraction. The filesystem can be periodically re-crawled to identify new files for which potential extraction latencies have not been previously quantified. Another option is to monitor filesystem operations, and identify new files on the filesystem.

The content of each file identified as meeting the threshold is extracted and stored. The extracted content can be stored, for example, in a database, with a mapping maintained between stored content and the original file from which it was extracted. In another embodiment, extracted content can be stored in association with the original file from which it was extracted, as an Alternate Data Stream (ADS) or as a named fork. Stored content can be encrypted, compressed, and/or digitally signed, e.g., with a checksum of the original file from which it was extracted. An index of the stored extracted content is maintained, tracking all files from which content has been extracted, according to factors such as size and checksum.

When a specific file in the filesystem of the computer is transferred, it is determined whether its content has already been extracted, for example by matching the file size and checksum against those for which extracted content has been stored. Responsive to determining that content of the specific file has already been extracted and stored, the stored content is utilized when applying DLP, thereby greatly increasing performance. Where the content of the specific file being transferred has not already been extracted, the content is extracted before applying DLP policies. Where desired (e.g., the extraction took a significantly long amount of time), the extracted content can be stored for future use. Statistics concerning extraction times can further be used to dynamically update criteria used to quantify potential extraction latencies of files, such as adjusting weightings of file types.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
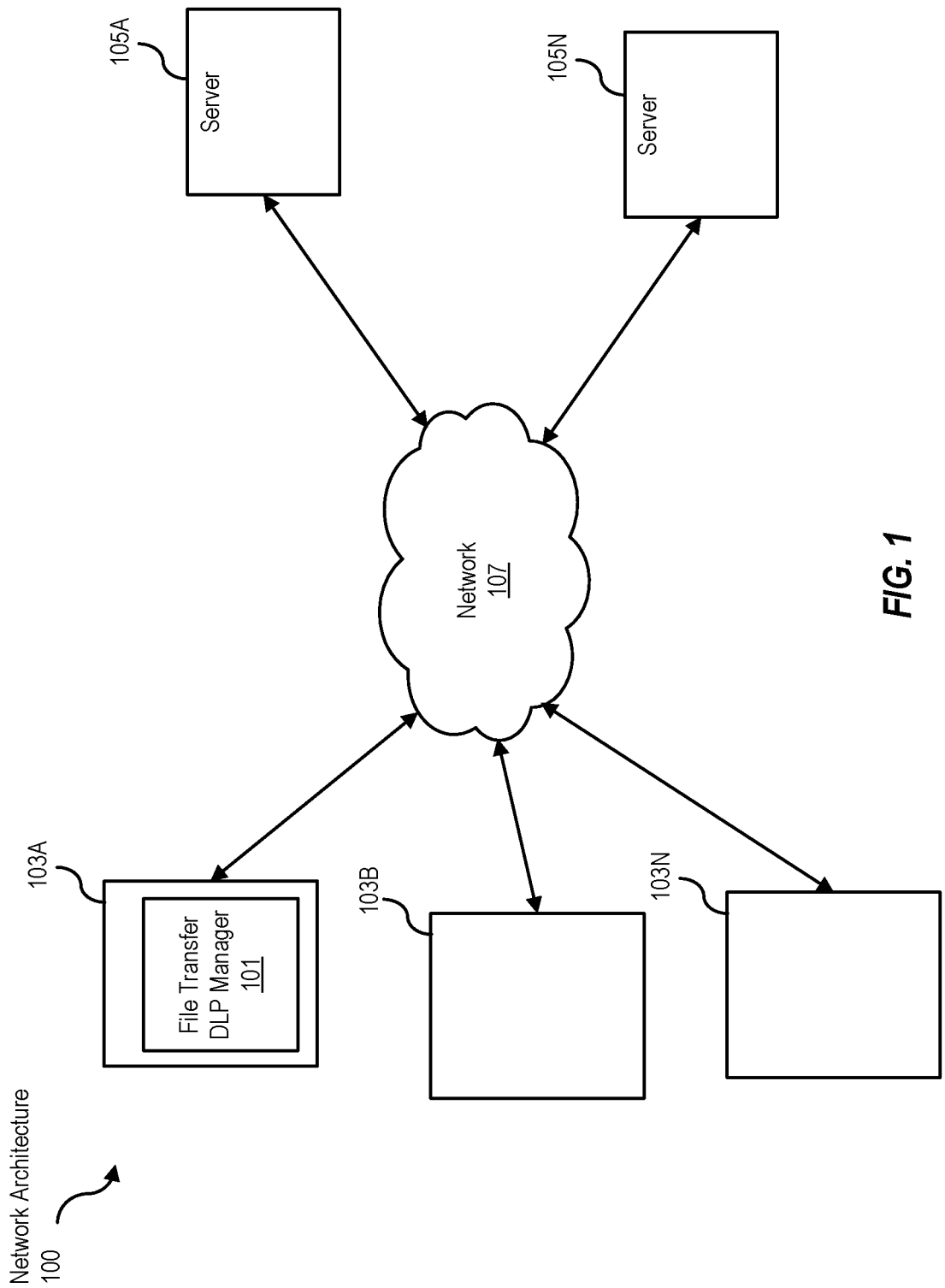
FIG. 1 is a block diagram of an exemplary network architecture in which a file transfer DLP manager can be implemented, according to some embodiments.

FIG. 1 is a block diagram illustrating an exemplary network architecture 100 in which a file transfer DLP manager 101 can be implemented. The illustrated network architecture 100 comprises multiple clients 103A, 103B and 103N, as well as multiple servers 105A and 105N. In FIG. 1, a file transfer DLP manager 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
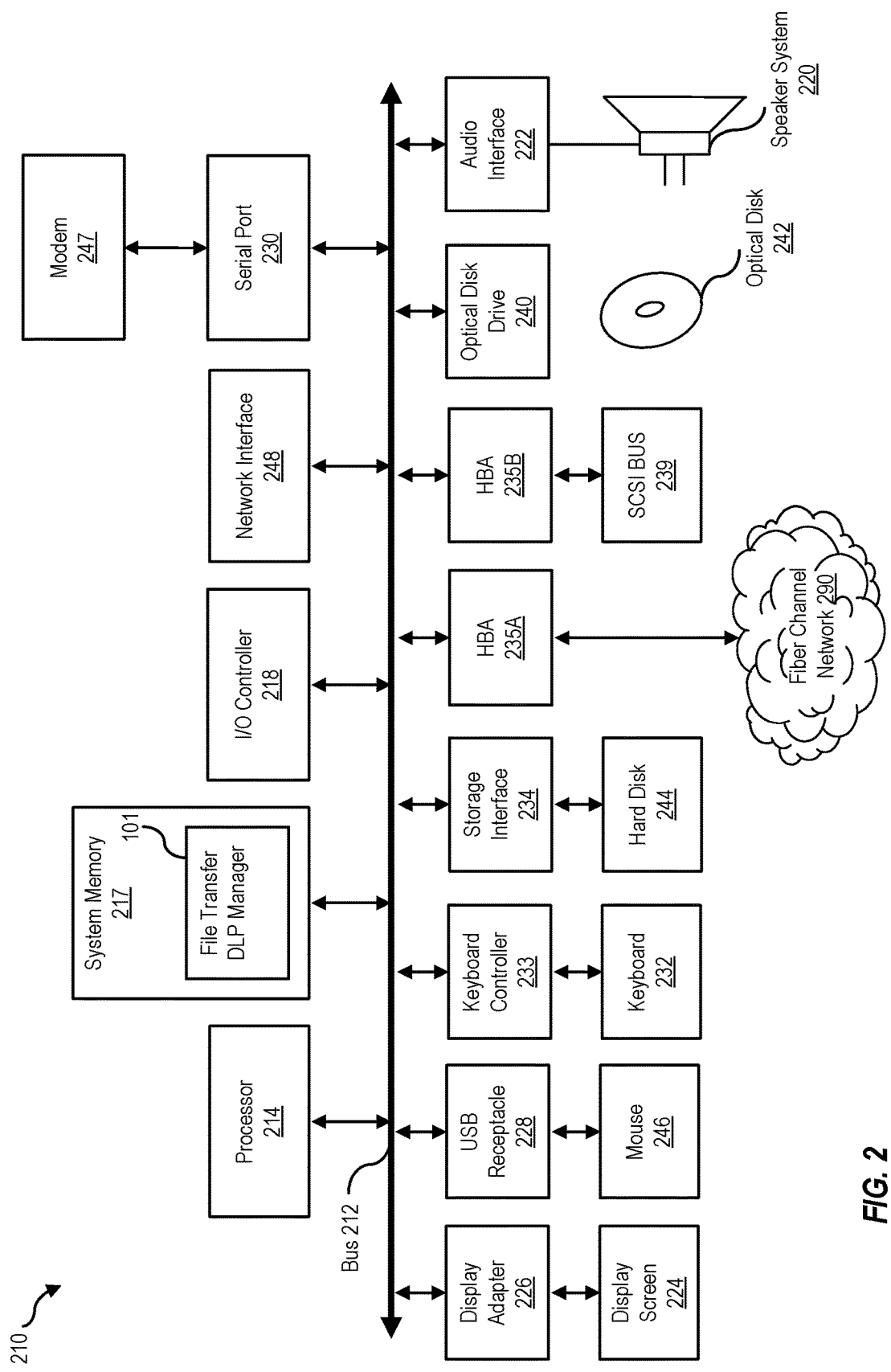
FIG. 2 is a block diagram of a computer system suitable for implementing a file transfer DLP manager, according to some embodiments.

FIG. 2 is a block diagram of a computer system 210 suitable for implementing a file transfer DLP manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the file transfer DLP manager 101 is illustrated as residing in system memory 217. The workings of the file transfer DLP manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
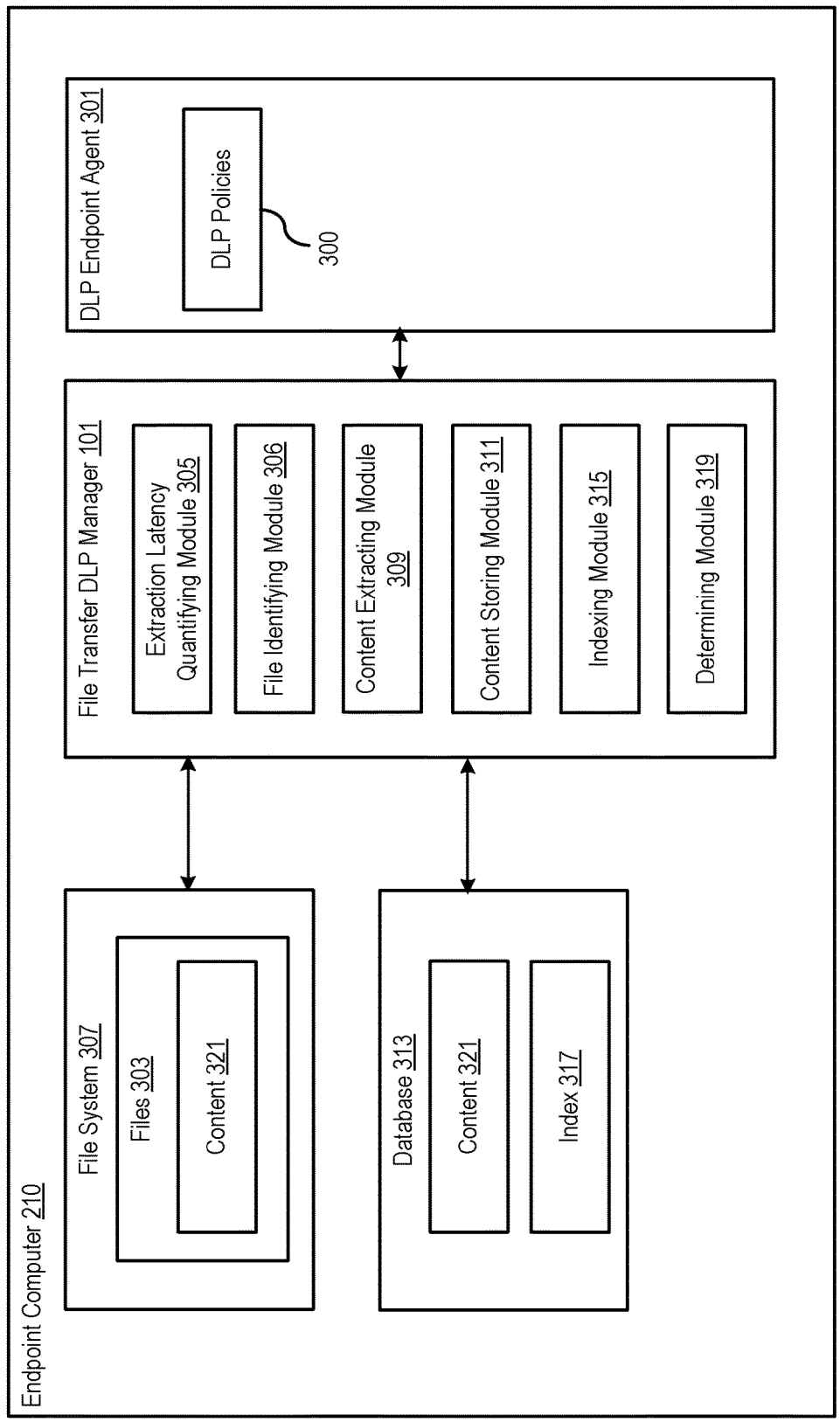
FIG. 3 is a block diagram of the operation of a file transfer DLP manager, according to some embodiments.

FIG. 3 illustrates the operation of a file transfer DLP manager 101, according to some embodiments. As described above, the functionalities of the file transfer DLP manager 101 can reside on a client 103, a server 105, or be distributed between multiple computer systems 210, including within a cloud-based computing environment in which the functionality of the file transfer DLP manager 101 is provided as a service over a network 107. It is to be understood that although the file transfer DLP manager 101 is illustrated in FIG. 3 as a single entity, the illustrated file transfer DLP manager 101 represents a collection of functionalities, which can be instantiated as a single or multiple modules as desired (an instantiation of specific, multiple modules of the file transfer DLP manager 101 is illustrated in FIG. 3). It is to be understood that the modules of the file transfer DLP manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the file transfer DLP manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a file transfer DLP manager 101 runs on an endpoint computer 210 (e.g., a client 103). FIG. 3 also illustrates a DLP endpoint agent 301. For efficiency of illustration and explanation, the file transfer DLP manager 101 and the DLP endpoint agent 301 are illustrated as separate entities. It is to be understood that these items represent collections of functionalities, and in some embodiments the file transfer DLP manager 101 is instantiated as a component of the DLP endpoint agent 301. Some of the functionalities described herein as being performed by or in conjunction with the DLP endpoint agent 301 can in some embodiments be performed by one or more backend DLP components (not illustrated) executing on one or more remote computers 210 (e.g., cloud based severs 105).

As described in detail below, the file transfer DLP manager 101 reduces the time spend on DLP during file transfer operations, by front loading content extraction. During its course of operation, the DLP endpoint agent 301 executes multiple functionalities in order to analyze content 321 during a file transfer operation. When a given file 303 is transferred (e.g., copied to a network share, saved to an external USB device, attached to an outbound email, etc.), the content 321 is inspected so that the DLP policies 300 can be applied. To do so, the DLP endpoint agent 301 first identifies the file type (e.g., Microsoft Word® .docx, PDF, zip file, etc.). In the case of an archive file (e.g., tar, zip, etc.), its sub-files 303 are extracted. At this point, the content 321 of the body of the file 303 is extracted, as well as the metadata from, e.g., the header. The content 321 comprises the textual, graphic and/or binary data in the body of the file 303, as opposed to metadata typically found in headers or elsewhere in the filesystem 307, such as size, owner, access permissions, etc. The DLP endpoint agent 301 can then analyze the content 321 and metadata, and apply the DLP policies 300 (e.g., allow or block the file transfer operation, delete the file, redact the content 321, generate an alert, etc.). For DLP during file transfers, extraction of the content 321 takes the maximum amount of the time. Typically, extraction accounts from around 50-90% of the DLP time, depending upon the file type. Thus, by extracting content 321 upfront and subsequently using pre-extracted content 321 during DLP as described in detail below, the file transfer DLP manager 101 greatly optimizes performance.

An extraction latency quantifying module 305 of the file transfer DLP manager 101 identifies files 303 in the filesystem 307 of the endpoint computer 210, and quantifies their potential extraction latencies. As the term is used herein, the "potential extraction latency" of a file 303 is a measure of the length of time the extraction of a file's content 321 is anticipated to take, based on factors concerning the file such as its type, size, etc. It is empirically known that extracting content 321 from certain file types takes longer than from others. Specific examples of file types with relatively longer extraction times include PDF files, Excel .xls and .xlsx files, and other Microsoft Office® files. The same is also true for some compressed file formats, such as tar and zip. The size of the file 303 also affects the time required to extract its content 321. The extraction latency quantifying module 305 can crawl the local filesystem 307 and determine, for each specific file 303, how long extracting its content 321 is likely to take based on factors such as these.

In different embodiments, the potential extraction latency is quantified in different ways. In one embodiment, weights are assigned according to file type, and potential extraction latency of each file 303 is calculated as a function of its weight and size. A file identifying module 306 of the file transfer DLP manager 101 identifies those files 303 with potential extraction latencies that meet a given threshold for pre-transfer extraction. The specific formula to use to calculate potential extraction latency is a variable design parameter, which can be adjusted as desired. The weights to assign to different file types are also variable design parameters, and can be adjusted up and down as desired, as can the threshold used to identify files 303 for pre-transfer extraction. In some embodiments, other factors besides file type and size can be used in quantifying potential extraction latency, such as location, owner, access permissions, etc. In some embodiments, the criteria used to calculate potential extraction latency and/or to otherwise identify specific files 303 for pre-transfer extraction is dynamically fine-tuned or otherwise updated based on actual extraction times observed and/or other factors. Such embodiments are described in more detail below.

Once the files 303 that are to be subject to pre-transfer extraction have been identified, a content extracting module 309 of the file transfer DLP manager 101 extracts their content 321 for future use in DLP operations. A content storing module 311 of the file transfer DLP manager 101 securely stores the extracted content 321 of the identified files. In one embodiment, the content storing module 311 stores the extracted content 321 in a local database 313 (or other storage mechanism), maintaining a mapping between stored content 321 and the original file 303 from which it was extracted. An indexing module 315 of the file transfer DLP manager 101 maintains an index 317 (for example, in the form of an table in the database 313), tracking all files 303 from which content 321 has been extracted by attributes such as file size, original file checksum, original file location, extracted file details such as path, file type, etc. In some embodiments, extracted content 321 is stored in encrypted format. In some embodiments, compression is applied to stored content 321. The stored content 321 can also be digitally signed along with the checksum of the original file 303, to protect against tampering. In another embodiment, extracted content 321 can be stored in direct association with the original file 303 itself in the local filesystem 307, for example as an Alternate Data Stream (ADS) under Windows, or as a named fork under UNIX, Linux or Mac OS X version 10.10.4 and above. The extracted content 321 from a given file 303 can be stored in encrypted format in an ADS or named fork, An index 317 is maintained, as described above in conjunction with the database 313 embodiment.

After the initial crawl of the local filesystem 307, the storage of extracted file content 321 can be kept current by periodically re-crawling the filesystem 307, identifying any new files 303 not previously quantified, and quantifying their potential extraction latencies. The content 321 of any newly quantified files 303 meeting the given threshold is stored and extracted, as described above. The frequency at which to re-crawl the filesystem 307 is a variable design parameter. In another embodiment, a filesystem filter driver is used to detect any new files 303 on the filesystem 307 that meet the threshold (e.g., based on file type and size). In other words, relevant filesystem operations are monitored to detect new files 303 meeting the extraction latency threshold (e.g., either existing files 303 that grow in size, or files newly transferred to or created on the filesystem 307). When such files 303 are identified, their content 321 is extracted and stored.

When files 303 are transferred (e.g., copied to a removable device or a network share, or attached to an outgoing email), the DLP agent 301 performs DLP analysis on their content 321, and applies DLP policies 300. For those files 303 for which content 321 has already been extracted, the DLP agent 301 uses the pre-extracted content 321 for performing the DLP analysis, rather than extracting the content 321 at the time of the transfer operation. This results in a tremendous performance gain. Describing this process in greater detail, when a file transfer operation occurs on which the DLP agent 303 is to perform DLP functionality, a determining module 319 of the file transfer DLP manager 101 determines whether content 321 of the specific file 303 has already been extracted and stored. To do so, the file size and checksum of the file 303 being transferred can be matched against those of files 303 for which extracted content 321 has been stored. More specifically, the determining module 319 can check the index 317, which contains sizes and checksums of the original files 303. In one embodiment, if any matches are found in the index 317 on the size of the file 303 being transferred, the checksum of the file 303 being transferred is calculated. The calculated checksum is then compared to that of the index entry (or entries) that match the file size. If a match is found on the checksum, then the corresponding stored extracted content 321 is retrieved and utilized for the DLP. Performing the steps in the above-described order (compare size first and only calculate checksum in response to a match) saves computing resources, because calculating a checksum is computationally expensive relative to a compare operation. The less efficient procedure of calculating the checksum and looking for a match on that without first finding a size match would work, and could be used in another embodiment. In other embodiments, pre-extracted content 321 can be identified by matching on other index 317 criteria.

If no match is found, the content 321 of the file 303 being transferred has not been pre-extracted, so the content 321 is extracted at the time of the transfer operation for the DLP. In some embodiments, whenever this occurs the extraction time is measured. Where the extraction time meets a given threshold, the extracted content 321 can be stored to avoid future extractions in the event of the same file 303 being transferred again. Statistics concerning extraction times can also be used to dynamically update criteria used to identify files 303 for future pre-extraction and storage. For example, if content 321 extracted from files 303 of a given type is observed to be taking longer to extract than anticipated, the weight for that file type could be increased.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for decreasing latency during application of data loss prevention policies during file transfer operations on a computer, the method comprising:
   quantifying potential extraction latencies of files in a filesystem of the computer, based on at least file type and file size, the files in the filesystem being of multiple file types;
   identifying files with potential extraction latencies meeting a specific threshold for pre-transfer extraction of content;
   extracting content of each file identified as meeting the specific threshold for pre-transfer extraction of content;
   storing extracted content of each identified file separately from each underlying file from which content was extracted;
   maintaining a mapping between stored extracted content and each underlying file from which the stored extracted content was extracted, the mapping facilitating use of stored extracted content for data loss prevention operations when files are subsequently transferred;
   indexing the stored extracted content of each identified file;
   maintaining an index tracking all files from which content has been extracted by attributes of at least one attribute type from a group of attribute types consisting of: file size, file checksum, original file location, file path, and file type;
   when a specific file in the filesystem of the computer is subsequently transferred, determining whether content of the specific file has already been extracted and stored separately from the specific file; and
   responsive to determining that content of the specific file has already been extracted and separately stored from the specific file, executing data loss prevention operations on the extracted content of the specific file, as opposed to extracting content of the specific file as part of the execution of the data loss prevention operations, thereby decreasing latency of the data loss prevention operations during transfer of the specific file.

2. The method of claim 1 wherein quantifying potential extraction latencies of files in a filesystem of the computer further comprises:
   crawling the filesystem of the computer and quantifying potential extraction latency of each specific file.

3. The method of claim 1 wherein quantifying potential extraction latencies of files in a filesystem of the computer further comprises:
   assigning weights to file types; and
   calculating potential extraction latencies of files as a function of their weights and sizes.

4. The method of claim 1 wherein a potential extraction latency of a specific file further comprises:
   a measure of a length of time extraction of content of the specific file is anticipated to take.

5. The method of claim 1 wherein storing extracted content of each identified file further comprises:
   storing the extracted content from each identified file in a database.

6. The method of claim 1 wherein storing extracted content of each identified file further comprises:
   storing extracted content in association with an original file from which it was extracted, as an alternate data stream or as a named fork.

7. The method of claim 1 wherein storing extracted content of each identified file further comprises:
   storing the extracted content in encrypted format.

8. The method of claim 1 wherein storing extracted content of each identified file further comprises:
   digitally signing stored extracted content with a checksum of an original file from which it was extracted.

9. The method of claim 1 wherein extracting content of files further comprises:
   utilizing statistics concerning extraction times to dynamically update criteria used to quantify potential extraction latencies of files.

10. The method of claim 1 wherein indexing the stored extracted content of each identified file, and maintaining an index tracking all files from which content has been extracted further comprises:
    tracking all files from which content has been extracted according to at least file size and file checksum.

11. The method of claim 1 wherein identifying files with potential extraction latencies meeting a specific threshold for pre-transfer extraction of content further comprises:
periodically crawling the filesystem and identifying new files for which potential extraction latencies have not been previously quantified; and
quantifying potential extraction latencies of newly identified files.

12. The method of claim 1 wherein identifying files with potential extraction latencies meeting a specific threshold for pre-transfer extraction of content further comprises:
monitoring filesystem operations on the computer; and
identifying new files on the filesystem that meet the specific threshold for pre-transfer extraction of content.

13. The method of claim 1 wherein determining whether content of a specific file in the filesystem has already been extracted and separately stored further comprises:
matching file size and file checksum of the specific file against those of files for which extracted content has been separately stored.

14. The method of claim 1 further comprising:
responsive to determining that content of a second specific file has not already been extracted and stored, extracting the content of the second specific file when applying data loss prevention functionality; and
storing extracted content of the second specific file.

15. At least one non-transitory computer readable-storage medium for decreasing latency during application of data loss prevention policies during file transfer operations on a computer, the at least one non-transitory computer readable-storage medium storing computer executable instructions that, when loaded into computer memory and executed by at least one processor of a computing device, cause the computing device to perform the following steps:
quantifying potential extraction latencies of files in a filesystem of the computer, based on at least file type and file size, the files in the filesystem being of multiple file types;
identifying files with potential extraction latencies meeting a specific threshold for pre-transfer extraction of content;
extracting content of each file identified as meeting the specific threshold for pre-transfer extraction of content;
storing extracted content of each identified file separately from each underlying file from which content was extracted;
maintaining a mapping between stored extracted content and each underlying file from which the stored extracted content was extracted, the mapping facilitating use of stored extracted content for data loss prevention operations when files are subsequently transferred;
indexing the stored extracted content of each identified file;
maintaining an index tracking all files from which content has been extracted by attributes of at least one attribute type from a group of attribute types consisting of: file size, file checksum, original file location, file path, and file type;
when a specific file in the filesystem of the computer is subsequently transferred, determining whether content of the specific file has already been extracted and stored separately from the specific file; and
responsive to determining that content of the specific file has already been extracted and separately stored from the specific file, executing data loss prevention operations on the extracted content of the specific file, as opposed to extracting content of the specific file as part of the execution of the data loss prevention operations, thereby decreasing latency of the data loss prevention operations during transfer of the specific file.

16. The at least one non-transitory computer readable-storage medium of claim 15 wherein quantifying potential extraction latencies of files in a filesystem of the computer further comprises:
assigning weights to file types; and
calculating potential extraction latencies of files as a function of their weights and sizes.

17. The at least one non-transitory computer readable-storage medium of claim 15 wherein determining whether content of a specific file in the filesystem has already been extracted and separately stored further comprises:
matching file size and file checksum of the specific file against those of files for which extracted content has been separately stored.

18. A computer system for decreasing latency during application of data loss prevention policies during file transfer operations, the computer system comprising:
at least one processor;
system memory;
an extraction latency quantifying module residing in the system memory, the extraction latency quantifying module being programmed to quantify potential extraction latencies of files in a filesystem based on at least file type and file size, the files in the filesystem being of multiple file types;
a file identifying module residing in the system memory, the file identifying module being programmed to identify files with potential extraction latencies meeting a specific threshold for pre-transfer extraction of content;
a content extracting module residing in the system memory, the content extracting module being programmed to extract content of each file identified as meeting the specific threshold for pre-transfer extraction of content;
a content storing module residing in the system memory, the content storing module being programmed to:
store extracted content of each identified file separately from each underlying file from which content was extracted; and
maintain a mapping between stored extracted content and each underlying file from which the stored extracted content was extracted, the mapping facilitating use of stored extracted content for data loss prevention operations when files are subsequently transferred;
an indexing module residing in the system memory, the indexing module being programmed to:
index the stored extracted content of each identified file, and
maintain an index tracking all files from which content has been extracted by attributes of at least one attribute type from a group of attribute types consisting of: file size, file checksum, original file location, file path, and file type;
a determining module residing in the system memory, the determining module being programmed to determine whether content of a specific file has already been extracted and stored separately from the specific file, when the specific file in the filesystem of the computer is subsequently transferred; and
a data loss prevention agent residing in the system memory, the data loss prevention agent being programmed to execute data loss prevention operations on the extracted content of the specific file, as opposed to extracting content of the specific file as part of the execution of the data loss prevention operations, thereby decreasing latency of the data loss prevention operations during transfer of the specific file responsive to determining that content of the specific file has already been extracted and separately stored from the specific file.

\* \* \* \* \*